US010206329B2

(12) United States Patent
Alexandersson et al.

(10) Patent No.: US 10,206,329 B2
(45) Date of Patent: Feb. 19, 2019

(54) DUAL DIRECTION TRIMMER WITH SELF DETECTION CAPABILITY

(71) Applicant: HUSQVARNA AB, Huskvarna (SE)

(72) Inventors: Daniel Alexandersson, Huskavarna (SE); Johan Svennung, Vetlanda (SE); Ted Wolfram, Vrigstad (SE); Stefan Holmberg, Huskvarna (SE); Pär Martinsson, Jönköping (SE); Mikael Kågebäck, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 15/561,282

(22) PCT Filed: Mar. 26, 2015

(86) PCT No.: PCT/EP2015/056571
§ 371 (c)(1),
(2) Date: Sep. 25, 2017

(87) PCT Pub. No.: WO2016/150514
PCT Pub. Date: Sep. 29, 2016

(65) Prior Publication Data
US 2018/0116104 A1 May 3, 2018

(51) Int. Cl.
A01D 34/00 (2006.01)
A01D 34/416 (2006.01)
A01D 34/90 (2006.01)
(52) U.S. Cl.
CPC ......... A01D 34/006 (2013.01); A01D 34/416 (2013.01); A01D 34/90 (2013.01)

(58) Field of Classification Search
CPC ..... A01D 34/006; A01D 34/416; A01D 34/90
See application file for complete search history.

(56) References Cited

U.S. PATENT DOCUMENTS 10,028,432 B2 * 7/2018 Ifuku ..................... A01D 34/90
2006/0075732 A1 * 4/2006 Nottingham ......... A01D 34/416
56/12.7

(Continued)

FOREIGN PATENT DOCUMENTS

WO 2011005156 A1 1/2011

OTHER PUBLICATIONS

International Search Report and Written Opinion for International Application No. PCT/EP2015/056571 dated Oct. 14, 2015.

(Continued)

Primary Examiner — Sean Michalski
(74) Attorney, Agent, or Firm — Burr Forman McNair

(57) ABSTRACT

A method of controlling operation of a hand held power tool may include receiving information indicative of a type of cutting equipment attached to the hand held power tool (100) based on operation of a working assembly (130) in a selected direction of rotation. The working assembly (130) may be configured to be bi-directionally rotatable to perform a cutting function using cutting equipment attachable to the hand held power tool (100). The method may further include determining the type of cutting equipment attached based on the received information, and selectively inserting an operational constraint on the working assembly based on the type of cutting equipment and a selected direction of rotation for the working assembly.

20 Claims, 5 Drawing Sheets

(56) References Cited

U.S. PATENT DOCUMENTS

| | | | | |
|---|---|---|---|---|
| 2006/0254063 A1* | 11/2006 | Richards | ............ | A01D 34/416 30/276 |
| 2007/0050991 A1* | 3/2007 | Mooney | ................ | A01G 3/053 30/210 |
| 2010/0313430 A1* | 12/2010 | Yamaoka | ............ | A01D 34/828 30/276 |
| 2011/0232436 A1* | 9/2011 | Morabit | ............... | A01D 34/902 83/13 |
| 2011/0305851 A1* | 12/2011 | Wang | ..................... | B41M 5/52 428/32.31 |
| 2013/0055575 A1* | 3/2013 | Delmas | ................. | A01G 3/037 30/228 |
| 2013/0276336 A1* | 10/2013 | Hartwick | ............ | E02F 9/2203 37/348 |
| 2014/0150619 A1* | 6/2014 | Fujihara | ............... | B26F 1/3813 83/401 |
| 2014/0182431 A1* | 7/2014 | Hasegawa | ............ | B26F 1/3813 83/72 |
| 2015/0231901 A1* | 8/2015 | Matsushita | ............ | B41J 11/663 347/110 |

OTHER PUBLICATIONS

International Preliminary Report on Patentability for International Application No. PCT/EP2015/056571 dated Sep. 26, 2017.

* cited by examiner

DUAL DIRECTION TRIMMER WITH SELF DETECTION CAPABILITY

TECHNICAL FIELD

Example embodiments generally relate to an outdoor power device that employs trimmer line or a blade and, more particularly, relate to such a trimmer having the capability for self detection of whether the trimmer line or blade is attached.

BACKGROUND

Handheld outdoor power devices such as trimmers, blowers, chainsaws, and/or the like, are often used to perform tasks relating to yard/grounds maintenance or even commercial resource harvesting activities that require them to be mobile. Although there are several options for powering such devices, including combustion engines, corded electric motors, or battery powered electric motors, each option may be viewed as having advantages in certain environments and for certain users.

Some trimming devices employ a trimmer line and are referred to as string trimmers. Alternatively, such devices may be known as edge trimmers, line trimmers, weed whips and/or the like. The trimmer line, which may be a monofilament line, is quite effective at cutting when rotated at high speed. Such a trimmer line is extended and held somewhat rigid by centrifugal forces while being rotated. The trimmer line is wound upon a reel or spool and the trimmer line can be released by bumping the trimmer head on the ground during operation. Meanwhile, other trimming devices may employ a blade for cutting thicker materials. However, the weight of such different cutting heads can be substantially different, and thus different control characteristics may be desirable for each.

BRIEF SUMMARY OF SOME EXAMPLES

Some example embodiments may be provided to enable a trimmer to determine itself whether the working assembly currently includes a trimmer head or a blade. The trimmer can then implement control functions accordingly.

In one example embodiment, a trimmer is provided. The trimmer may include an elongated member operably coupled to a handle assembly, a working assembly disposed at one end of the elongated member and configured to be bi-directionally rotatable to perform a cutting function using cutting equipment attachable to the trimmer, a power unit operably coupled to the working assembly to selectively cause rotation of the working assembly, and a control assembly configured to control the selective rotation of the working assembly. The control assembly is configured to receive information indicative of a type of cutting equipment attached to the trimmer based on operation of the working assembly in a selected direction of rotation, determine the type of cutting equipment attached based on the received information, and selectively insert operational constraints based on the type of cutting equipment and the selected direction of rotation.

In another example embodiment, a method of controlling operation of a trimmer is provided. The method may include receiving information indicative of a type of cutting equipment attached to the trimmer based on operation of a working assembly in a selected direction of rotation. The working assembly may be configured to be bi-directionally rotatable to perform a cutting function using cutting equipment attachable to the trimmer. The method may further include determining the type of cutting equipment attached based on the received information, and selectively inserting an operational constraint on the working assembly based on the type of cutting equipment and a selected direction of rotation for the working assembly.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
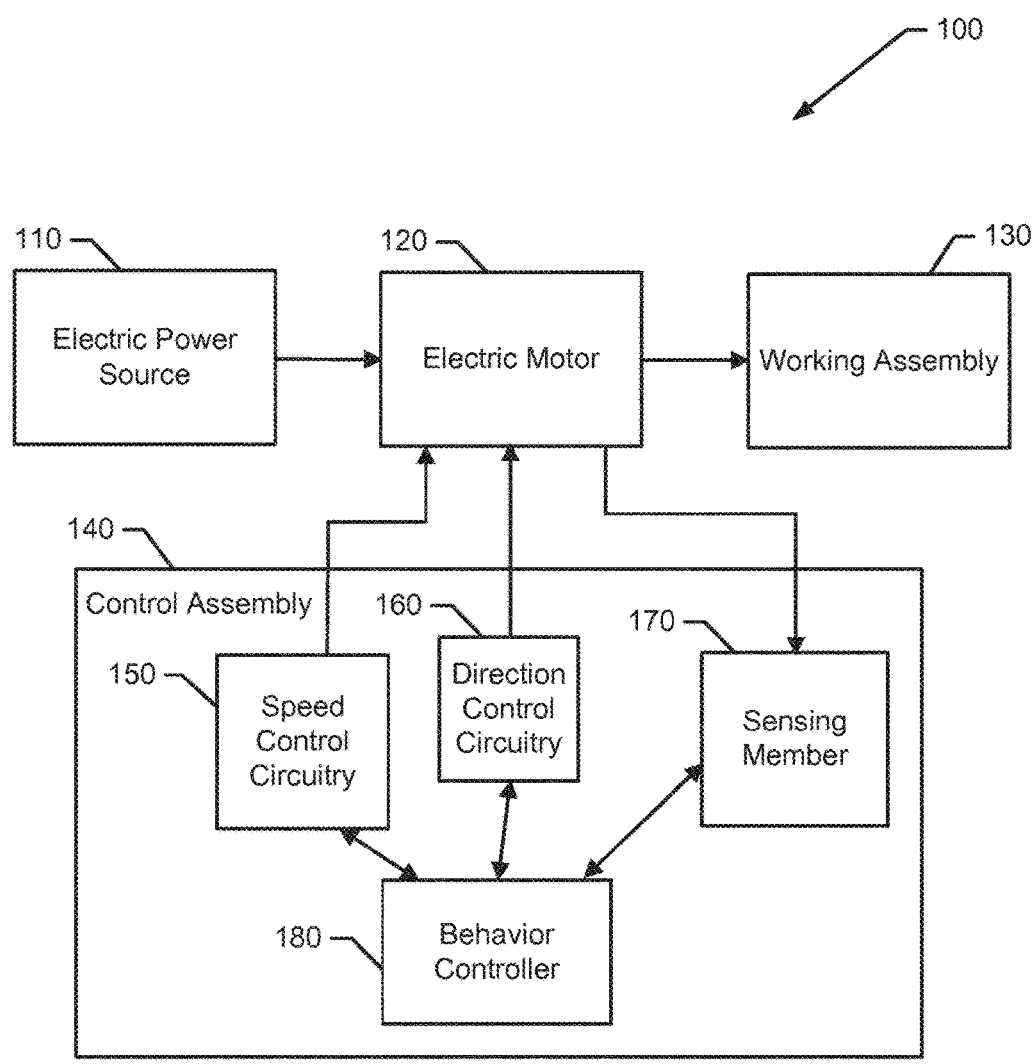
FIG. 1 illustrates a block diagram of the trimmer in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. One of skill in the art will appreciate the normal position in which devices of example embodiments are held for operation and that the working assembly represents the front of such devices. All other directional references should be understood in this general context.

A trimmer is provided herein that can employ different cutting equipment as a working assembly, and can detect which cutting equipment is employed. In this regard, the operator may choose to employ trimmer line or a blade as the cutting equipment. However, the running behavior of the product can generally not be consistent for both options of cutting equipment since the momentum of each option is substantially different. If the running behavior is not changed, for example, with a blade that has a locking nut that holds the blade, the locking nut may have the potential to unfasten itself when hitting something hard (e.g., a metal rod). Accordingly, example embodiments allow the trimmer itself to determine which cutting equipment is employed and correspondingly employ, institute or initiate operational constraints to ensure proper or safe operation of the cutting equipment that is employed.

With the advent of electric motors being commonly employed in line trimmers, reversing the direction of rotation of the trimmer head may become a relatively easy thing to do. Thus, it should be contemplated that dual direction trimmer head rotation may be employed. However, this also means that when locking nuts are employed to fix the trimmer head in place, the trimmer head may be turned in one direction that could loosen the locking nut. Special care must therefore be taken to make sure that operations are conducted in a manner that is most likely to avoid any loosening of the locking nut.

FIG. 1 illustrates a block diagram of a hand-held power tool 100 (e.g., a trimmer, blade saw, brush cutter, brush saw, grass trimmer, and/or the like) according to an example embodiment. As shown in FIG. 1, the tool 100 may include an electric power source 110 that powers an electric motor 120. The electric power source 110 could be a battery or mains power. The electric motor 120 may rotate to operate a working assembly 130 to perform a functional task. In some cases, the working assembly 130 may be a trimmer head that employs either a line trimmer or a cutting blade, or other rotating assembly or device cable of cutting material when engaged. The electric motor 120 may operate under the control of a control assembly 140 that may control the application of power to actuate the electric motor 120.

In some embodiments, the control assembly 140 may control, or otherwise provide the means for control of, the direction and speed of operation of the working assembly 130. Thus, for example, the control assembly 140 may include speed control circuitry 150 for control of the speed of at which the working assembly 130 is driven, and direction control circuitry 140 for controlling the direction of rotation of the working assembly 130. The speed control circuitry 150 and the direction control circuitry 160 may each be portions of the same control circuitry, or may be modular elements that are separated from each other. As such, the control assembly 140 may include a processor and/or processing circuitry that is configurable to interact with switches, triggers, buttons or control devices (e.g., at an operator panel and/or handle) of the tool 100 to direct the speed and/or direction of the turning of the working assembly 130.

As mentioned above, the tool 100 may employ different cutting equipment for the working assembly 130, and different control limitations may be desirable for implementation dependent upon which cutting equipment is attached. The control assembly 140 of an example embodiment may be further enabled to detect which cutting equipment is employed and implement behavior control (e.g., related to speed and direction) on the basis of the detected cutting equipment. To implement the behavior control, the control assembly 140 must first determine the cutting equipment that is currently being employed. In an example embodiment, a sensing member 170 may be operably coupled to the electric motor 120 (and/or the working assembly 130 or power source 110) to detect an operational characteristic of the electric motor 120 that may be uniquely different when the different cutting equipment options are employed. For example, the different weights of trimmer line cutting equipment and a blade may result in different inertia being generated for different respective cutting equipment types. The sensing member 170 may be configured to detect the inertia of the electric motor 120 and/or working assembly 130 during operation thereof. In some cases, power consumption may be indicative of the inertia. Thus, for example, the sensing member 170 may detect power consumption or power draw when the working assembly 130 is activated.

In an example embodiment, a behavior controller 180 may be provided to be operably coupled to the sensing member 170, the direction control circuitry 160 and the speed control circuitry 150 to receive information related to the inertia (e.g., power draw), direction of rotation, and speed, respectively, at which the tool 100 is being operated. Based on this information, the behavior controller 180 may be configured to confirm or otherwise determine the current state of operation (e.g., with a cutting blade or trimmer line). The behavior controller 180 may then be further configured to implement various operational constraints based on the current state of operation. The operational constraints may include constraints on operating speed.

Accordingly, for example, the control assembly 140 may be configured to provide selective control over the electric motor 120 based on the cutting equipment employed. However, the control assembly 140 may conduct this selective control in an automatic and autonomous fashion. In other words, the control assembly 140 may be configured to self-detect the cutting equipment being employed (e.g., without user involvement), and implement appropriate operational constraints based on the self-detection performed.

The behavior controller 180 may share the same processor or processing circuitry used for speed control and/or direction control, or may employ its own processor. As such, for example, a single processor of the control assembly 140 may provide control over various modular functional circuits of the control assembly 140. Alternatively, the control assembly 140 may be comprised of separate processors that each individually operate to perform corresponding functions for which they are configured. Moreover, in some cases, portions of the control assembly 140 could be distributed to corresponding different portions of the tool 100. However, in some cases, the control assembly 140 may be consolidated into a single location.

Figure 2:
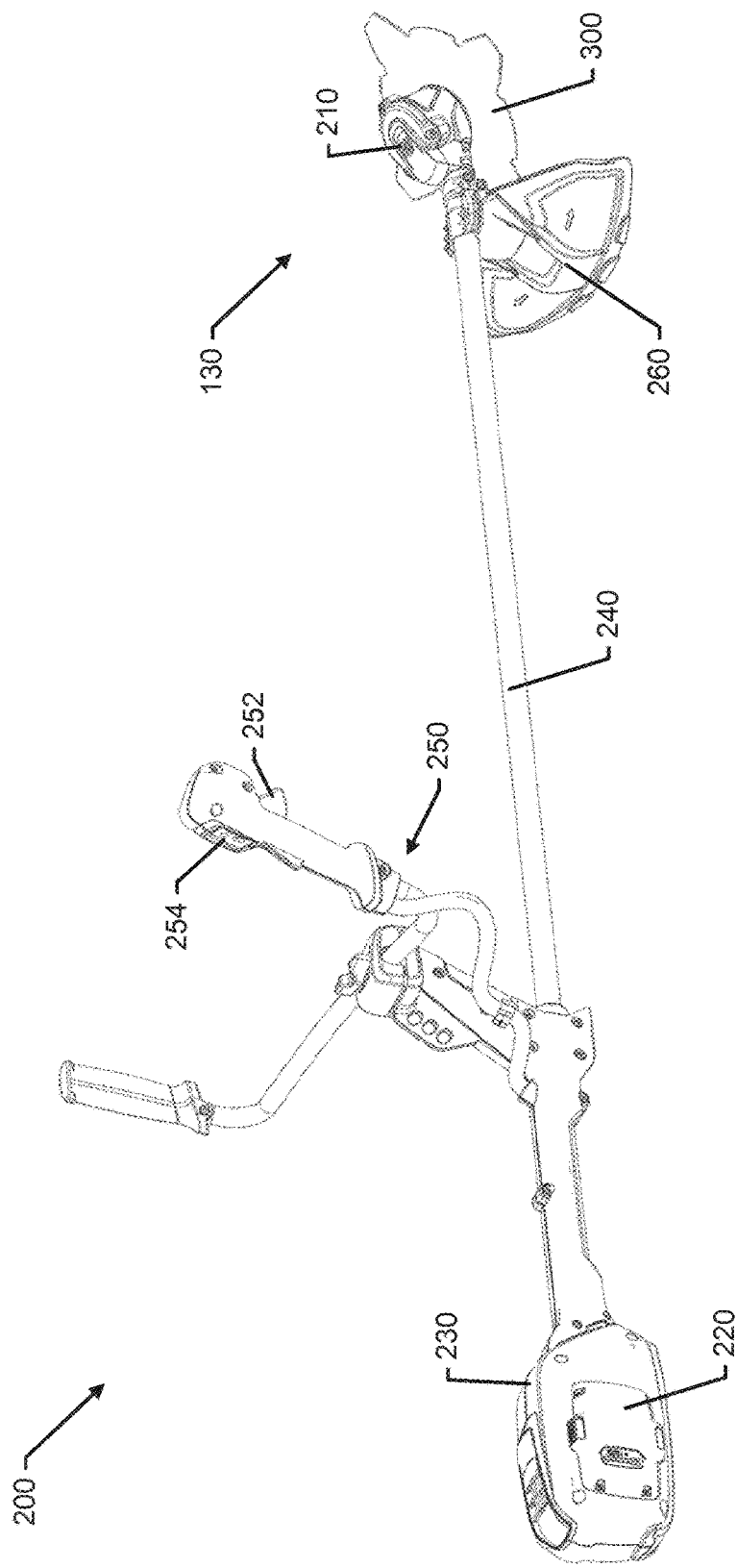
FIG. 2 illustrates a perspective view of an electric powered trimmer that may be configured in accordance with an example embodiment.
Figure 3:
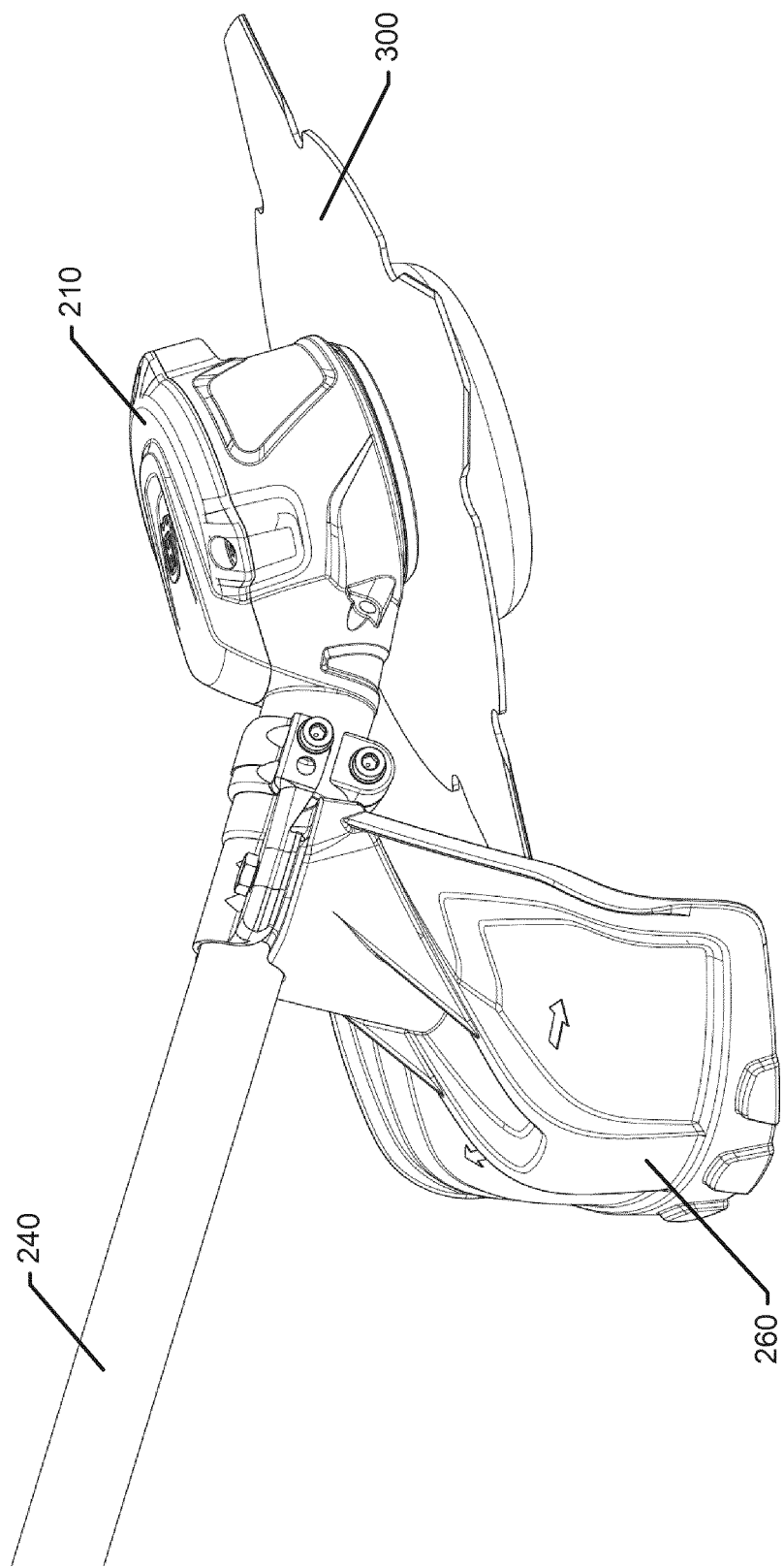
FIG. 3 illustrates a perspective view of the working assembly of the trimmer with a blade attached in accordance with an example embodiment.
Figure 4:
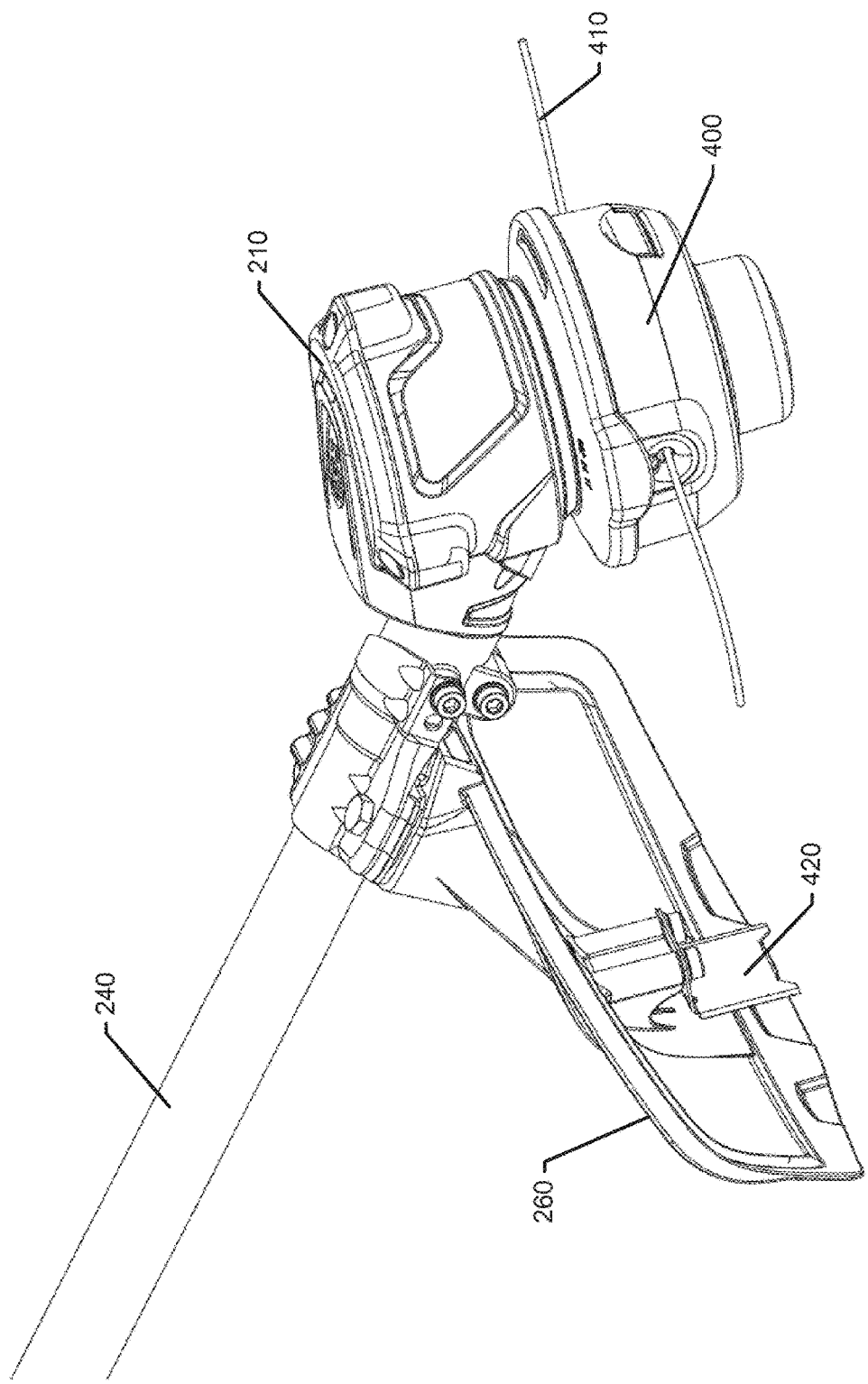
FIG. 4 illustrates a perspective view of the working assembly of the trimmer with a line trimmer spool attached in accordance with an example embodiment.

FIGS. 2-4 illustrate examples of the operational structures that may be employed in connection with one example of the tool 100 described above. In this regard, FIG. 2 shows a trimmer 200, which may be one example of the tool of FIG. 1. Meanwhile, FIGS. 3 and 4 illustrate different cutting equipment that can be employed as the working assembly 130 of the trimmer 200. In this regard, FIG. 3 illustrates a cutting blade 300 as the cutting equipment, and FIG. 4 illustrates a trimmer head 400 as the cutting equipment.

Referring to the FIGS. 2-4, the trimmer 200 is merely one example of an electric powered, tool that may be configured in accordance with an example embodiment. Thus, example embodiments could alternatively be employed in connection with corded versions of tools, and could be employed in connection with other particular designs for the handle and body portions of trimmers blade saws, brush cutters, brush saws, grass trimmers, and/or the like. Thus, although an example embodiment will be described hereinafter with specific reference to the battery powered trimmer 200 of FIG. 1, the applicability of alternative embodiments relative to other similar designs should be well understood.

As shown in FIG. 1, the trimmer 200 may include a working implement or working assembly 130, which in this example includes a rotatable cutting blade 300. The working assembly 130 may further include a motor (e.g., electric motor 120) disposed in a motor housing 210 of the working assembly 130. The motor of the trimmer 200 may be powered, according to this example, by a battery pack 220, which may be an example of the power source 110 of FIG. 1. The battery pack 220 is received into a battery compartment of the trimmer 200.

The battery compartment may be a recess or cavity formed in a casing 230 of the trimmer 200 disposed at one end of an elongated member 240 that may further include the working assembly 130 at an opposite end thereof. The elongated member 240 may be a hollow tube, pipe, rod or other such member that may be straight, curved or combinations thereof in different embodiments. The elongated member 240 may provide operable communication between the working assembly 130 and the battery pack 220 so that the battery pack 220 can power the working assembly 130 (e.g., by housing connecting wires). In some embodiments, the casing 230 may be formed from one or more plastic or other rigid components that may be molded to have a desired shape. The casing 230 may substantially enclose the battery compartment, control circuitry (e.g., the control assembly 140) and/or other components associated with powering and/or controlling the operation of the trimmer 200. However, it should also be appreciated that the battery pack of some alternative embodiments may be housed within a backpack that may be worn on the operator's back. In such an example, the battery pack may be connected to the trimmer 200 via a cord or other adaptor.

In an example embodiment, the trimmer 200 may include a handle assembly 250 provided along a portion of the elongated member 240. The handle assembly 250 may be adjustable to allow the operator to alter relative positions of right and left handles of the handle assembly 250. However, in other examples, a rear and forward handle could be provided at respective different locations along the elongated member 240 to form a different structure for the handle assembly 250. In any case, one of the handles may typically include a trigger 252 or other control mechanism for engaging operation of the motor to power the working assembly 130. The trigger 252 may provide input to the speed control circuitry 150 to control the speed at which the working assembly 130 is operated.

In some embodiments, one of the handles may further include an interface panel 254 (or control panel), which may provide switches, buttons, lights, and/or other indicators or operable members for allowing the operator to interface with and control certain aspects of the operation of the trimmer 200. The interface panel 254 may also provide information to the operator regarding the current state of the trimmer 200 and various operational constraints or other control related information that is implementable or being implemented by the control assembly 140. Of note, the interface panel 254 could alternatively be on the other handle, or even on the casing 230 in other embodiments.

The trimmer 200 may further employ a trim shield 260 that is configured to prevent cut materials and/or debris from coming back at the operator. The operator may actuate the trigger 252 to power the working assembly 130 and turn the cutting blade 300 of FIGS. 2 and 3, or the trimmer head 400 of FIG. 4. The trimmer head 400 may include trimmer line 410 that may extend outwardly (e.g., in a radial direction relative to a shaft forming an axis about which the trimmer head 400 rotates) from the trimmer head 400 to cut vegetation encountered thereby. The trim shield 260 may employ a single knife element 420 (see FIG. 4) to cut the trimmer line 410 to a length slightly less than the distance from the external periphery of the trimmer head 400 to the internal periphery of the trim shield 260 responsive to rotation of the trimmer head 400.

In an example embodiment, the motor may be a DC motor or a brushless DC motor (BLDC) that is powered by the battery pack 220. The motor may be configured to turn in either the clockwise or counterclockwise direction when a power switch is powered on, and the trigger 252 is actuated. In the example of FIG. 2, the power switch may be provided at the interface panel 254. In some embodiments, the interface panel 254 may further include a directional selector switch that may be used to select the direction of rotation (e.g., clockwise or counterclockwise) of the working assembly 130. Thus, as can be appreciated from FIGS. 2-4, the operator may replace the trimmer head 400 with the cutting blade 300 (or vice versa) and operate the working assembly 130 with the selected cutting equipment in either direction based on the positioning of the directional selector switch. When the trigger 252 is pressed (assuming the device is powered on), the working assembly 130 will rotate in the corresponding direction indicated by the directional selector switch. However, in some cases, the working assembly 130 may initially start in a predetermined direction until the determination is made as to the type of cutting equipment that is attached. Information regarding operation of the working assembly 130 may then be detected by the control assembly 140 (e.g., as sensed by the sensing member 170 and determined by the behavior controller 180) to determine which type of cutting equipment is attached (e.g., the trimmer head 400 or the cutting blade 300). Operational constraints may then be implemented (e.g., speed controls based on direction of operation and cutting equipment attached) by the behavior controller 180.

In an example embodiment, the behavior controller 180 may be configured to execute a behavior control algorithm when the tool 100 is operated. In some cases, the algorithm may be executed after any direction change, power up, or any powered operation after a predetermined period of time since the last operation has passed. Thus, for example, if a direction change is inserted, the product behavior will depend on the cutting equipment that is attached. In this regard, for example, if the cutting blade 300 is attached, the tool 100 may be controlled to operate at a reduced speed during a specified time in a direction that could otherwise unfasten the locking nut. After the specified time has passed or the trigger is released, the tool 100 may automatically turn back to the other direction at full speed.

The behavior controller 180 may therefore be configured to protect against the risk that the tool 100 could be rendered unsafe by the locking nut unfastening itself. The tool 100 detects (e.g., via inertia measurements) which cutting equipment is attached and then automatically modifies its running behavior to insert operational constraints as appropriate. By inserting the operational constraints, the risk of destroying or damaging teeth on the cutting blade 300 may be reduced since the tool 100 may be inhibited relative to running at full speed in certain directions (e.g., clockwise).

Figure 5:
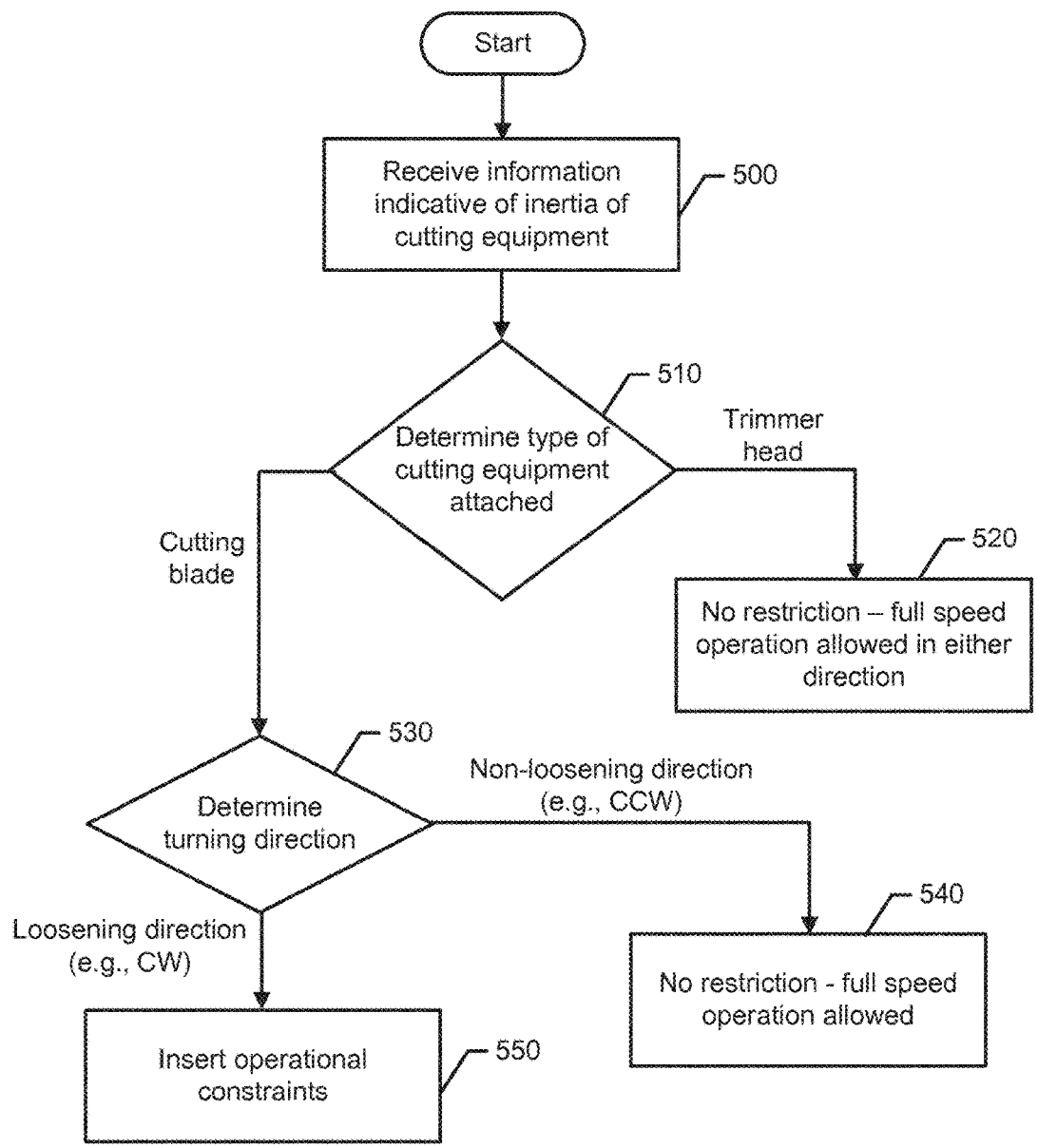
FIG. 5 illustrates a block diagram of a method for self detection of running behavior on the trimmer in accordance with an example embodiment.

FIG. 5 illustrates a block diagram of a method for self detection of running behavior on the trimmer in accordance with an example embodiment. As such, FIG. 5 illustrates operations associated with the behavior control algorithm. The algorithm may be executed or triggered when specific operational criteria (e.g., corresponding to a trigger event) are met. As mentioned above, the trigger event may be, for example, a first trigger press after a direction change, a first trigger press after power up, or a first trigger press after a predetermined delay period. After the algorithm is triggered, information may be received that is indicative of the type of cutting equipment (e.g., inertia and/or power consumption information) at operation 500. Based on the information received, the type of cutting equipment attached may be determined at operation 510. After the cutting equipment type is determined, operational constraints may be selectively inserted on the basis of the type of cutting equipment and direction of rotation selected. If the cutting equipment is determined to be a trimmer head, then no restriction may be implemented at operation 520, and full speed operation may be allowed in either direction. However, if the cutting equipment is determined to be a cutting blade, then a further determination regarding the selected turning direction may be made at operation 530. If the selected turning direction is the non-loosening direction (e.g., relative to the locking nut that secures the cutting blade 300 to the tool 100), then there may be no restriction imposed at operation 540. As such, the cutting blade may be turned at full speed operation in the non-loosening direction (e.g., the counterclockwise direction). If the selected turning direction is the loosening direction (e.g., relative to the locking nut that secures the cutting blade 300 to the tool 100), then operational constraints may be inserted at operation 550. As such, the cutting blade may not be allowed to turn at full speed operation in the loosening direction (e.g., the clockwise direction).

In some embodiments, the operational constraints may include restrictions on the time at which the cutting blade 300 can be turned at max speed. For example, a predetermined time limit (e.g., a three second restriction) on full speed operation in the loosening direction may be applied. After the predetermined time limit is reached, turning direction may automatically return to the non-loosening direction. In some cases, additionally or alternatively, the speed may be restricted when turning in the loosening direction. For example, a speed limit of 40% of full speed may be employed for operation in the loosening direction. Notably, the speed limit may be relative to maximum cutting blade 300 speed, which may also already be slower than the maximum trimmer head 400 speed.

By employing an example embodiment, the tool 100 may be configured to allow changing of cutting equipment with automatic determination of the cutting equipment employed and corresponding automatic insertion of operational constraints when warranted. Although not required, the interface panel 254 may further include lights or other indications to inform the operator when an operational constraint is being applied. Alternatively or additionally, the interface panel 254 may indicate the direction of rotation that will be implemented when the trigger 252 is pulled and whether such operation will be employed in connection with an operational constraint. The type of operational constraint may also be indicated in some embodiments. Accordingly, the operator may avoid surprise, or may at least have an available explanation if an operational constraint is being applied, so that the operator does not have the impression that the device is not operating properly when operational constrains are being applied.

In accordance with an example embodiment, a hand-held cutting device (e.g., a trimmer) is provided. The device may include an elongated member operably coupled to a handle assembly, a working assembly disposed at one end of the elongated member and configured to be bi-directionally rotatable to perform a cutting function using cutting equipment attachable to the trimmer, a power unit operably coupled to the working assembly to selectively cause rotation of the working assembly, and a control assembly configured to control the selective rotation of the working assembly. The control assembly is configured to receive information indicative of a type of cutting equipment attached to the trimmer based on operation of the working assembly in a selected direction of rotation, determine the type of cutting equipment attached based on the received information, and selectively insert operational constraints based on the type of cutting equipment and the selected direction of rotation.

The device of some embodiments may include additional features that may be optionally added. For example, in some embodiments, (1) determining the type of cutting equipment may include determining whether the cutting equipment comprises a trimmer head or a cutting blade. In some cases, (2) selectively inserting operational constraints may include allowing unrestricted operation of the working assembly in response to the type of cutting equipment being determined to be the trimmer head. In an example embodiment, (3) selectively inserting operational constraints may include allowing unrestricted operation of the working assembly in response to the type of cutting equipment being determined to be the cutting blade and the selected direction of rotation being a non-loosening direction. In some examples, (4) selectively inserting operational constraints may include restricting a speed of rotation of the working assembly in response to the type of cutting equipment being determined to be the cutting blade and the selected direction of rotation being a loosening direction. In an example embodiment, (5) selectively inserting operational constraints comprises providing a time limit for rotation of the working assembly in a loosening direction in response to the type of cutting equipment being determined to be the cutting blade and the selected direction of rotation being the loosening direction. In some cases, (6) responsive to operation of the working assembly in the loosening direction for at least the time limit, the working assembly may be automatically operated in the non-loosening direction.

In some embodiments, any or all of (1) to (6) may be employed in addition to the optional modifications or augmentations described below. For example, in some embodiments, receiving the information indicative of the type of cutting equipment may include detecting inertia of the cutting equipment. Alternatively or additionally, receiving the information indicative of the type of cutting equipment may include detecting power consumption associated with rotating the working assembly. Alternatively or additionally, the working assembly may rotate responsive to activation by a trigger, and determining the type of cutting equipment may be performed responsive to a first trigger activation after a change to the selected direction of rotation, a first trigger activation after power up of the trimmer, or a first trigger activation after expiration of a predetermined delay period.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A hand held power tool comprising:
an elongated member operably coupled to a handle assembly;
a working assembly disposed at one end of the elongated member and configured to be bi-directionally rotatable to perform a cutting function using cutting equipment attachable to the hand held power tool;
a power unit operably coupled to the working assembly to selectively cause rotation of the working assembly; and
a control assembly configured to control the selective rotation of the working assembly,
wherein the control assembly is configured to:
receive information indicative of a type of cutting equipment attached to the trimmer based on operation of the working assembly in a selected direction of rotation;
determine the type of cutting equipment attached based on the received information; and
selectively insert operational constraints based on the type of cutting equipment and the selected direction of rotation.

2. The hand held power tool of claim 1, wherein determining the type of cutting equipment comprises determining whether the cutting equipment comprises a trimmer head or a cutting blade.

3. The hand held power tool of claim 2, wherein selectively inserting operational constraints comprises allowing unrestricted operation of the working assembly in response to the type of cutting equipment being determined to be the trimmer head.

4. The hand held power tool of claim 2, wherein selectively inserting operational constraints comprises allowing unrestricted operation of the working assembly in response to the type of cutting equipment being determined to be the cutting blade and the selected direction of rotation being a non-loosening direction.

5. The hand held power tool of claim 2, wherein selectively inserting operational constraints comprises restricting a speed of rotation of the working assembly in response to the type of cutting equipment being determined to be the cutting blade and the selected direction of rotation being a loosening direction.

6. The hand held power tool of claim 2, wherein selectively inserting operational constraints comprises providing a time limit for rotation of the working assembly in a loosening direction in response to the type of cutting equipment being determined to be the cutting blade and the selected direction of rotation being the loosening direction.

7. The hand held power tool of claim 6, wherein, responsive to operation of the working assembly in the loosening direction for at least the time limit, the working assembly is automatically operated in the non-loosening direction.

8. The hand held power tool of claim 1, wherein receiving the information indicative of the type of cutting equipment comprises detecting inertia of the cutting equipment.

9. The hand held power tool of claim 1, wherein receiving the information indicative of the type of cutting equipment comprises detecting power consumption associated with rotating the working assembly.

10. The hand held power tool of claim 1, wherein the working assembly rotates responsive to activation by a trigger, and wherein determining the type of cutting equipment is performed responsive to a first trigger activation after:
a change to the selected direction of rotation,
power up of the hand held power tool, or
expiration of a predetermined delay period.

11. A method of controlling operation of a hand held power tool, the method comprising:
receiving information indicative of a type of cutting equipment attached to the hand held power tool based on operation of a working assembly in a selected direction of rotation, the working assembly being configured to be bi-directionally rotatable to perform a cutting function using cutting equipment attachable to the hand held power tool;
determining the type of cutting equipment attached based on the received information; and
selectively inserting an operational constraint on the working assembly based on the type of cutting equipment and a selected direction of rotation for the working assembly.

12. The method of claim 11, wherein determining the type of cutting equipment comprises determining whether the cutting equipment comprises a trimmer head or a cutting blade.

13. The method of claim 12, wherein selectively inserting operational constraints comprises allowing unrestricted operation of the working assembly in response to the type of cutting equipment being determined to be the trimmer head.

14. The method of claim 12, wherein selectively inserting operational constraints comprises allowing unrestricted operation of the working assembly in response to the type of cutting equipment being determined to be the cutting blade and the selected direction of rotation being a non-loosening direction.

15. The method of claim 12, wherein selectively inserting operational constraints comprises restricting a speed of rotation of the working assembly in response to the type of cutting equipment being determined to be the cutting blade and the selected direction of rotation being a loosening direction.

16. The method of claim 12, wherein selectively inserting operational constraints comprises providing a time limit for rotation of the working assembly in a loosening direction in response to the type of cutting equipment being determined to be the cutting blade and the selected direction of rotation being the loosening direction.

17. The method of claim 16, wherein, responsive to operation of the working assembly in the loosening direction for at least the time limit, the working assembly is automatically operated in the non-loosening direction.

18. The method of claim 11, wherein receiving the information indicative of the type of cutting equipment comprises detecting inertia of the cutting equipment.

19. The method of claim 11, wherein receiving the information indicative of the type of cutting equipment comprises detecting power consumption associated with rotating the working assembly.

20. The method of claim 11, wherein the working assembly rotates responsive to activation by a trigger, and wherein determining the type of cutting equipment is performed responsive to a first trigger activation after:
   a change to the selected direction of rotation,
   power up of the hand held power tool, or
   expiration of a predetermined delay period.

\* \* \* \* \*